ём
United States Patent Office 3,155,526
Patented Nov. 3, 1964

3,155,526
CALCIUM ALUMINOSULFATE AND EXPANSIVE
CEMENTS CONTAINING SAME
Alexander Klein, Danville, Calif., assignor, by direct and mesne assignments, to Chemically Prestressed Concrete Corp., Van Nuys, Calif., a corporation of California
No Drawing. Filed Oct. 18, 1961, Ser. No. 145,964
9 Claims. (Cl. 106—89)

This invention relates to expansive cement compositions.

Portland cement is prepared by mixing together limestone and an argillaceous material, grinding the mixture to a fine powder, then putting the ground material through a kiln at a temperature of incipient fusion to form a clinker, which is then ground, together with a small amount of gypsum, into a fine powder. Chemically, Portland cement consists primarily of calcium silicates, principally tricalcium silicate and generally a smaller amount of beta dicalcium silicate together with lesser quantities of tricalcium aluminate and tetra calcium aluminoferrite, also minor quantities of alkalies and magnesia. Upon admixture with water the cement hydrates, sets and hardens and serves as a binder for sand, gravel or other mineral aggregates.

As is well known, concrete made from Portland cement, together with sand, gravel or other mineral aggregate, undergoes undesirable shrinkage on drying. This shrinkage is disadvantageous, among other reasons, because under conditions of restraint it generally gives rise to cracks in the concrete.

Efforts have been made heretofore to produce cement which will not shrink and which can be added to Portland cement or used in place of Portland cement to provide nonshrinking concrete. (By "nonshrinking" is meant that no net shrinkage occurs, although at some stage or other shrinkage may occur.)

As an example, inorganic cementitious compounds have been prepared which are expansive. That is to say, when such a compound is mixed with sand, gravel or other mineral aggregate and water and the mixture is allowed to set and cure, a net expansion occurs. By adding such an expansive component in suitable proportion to Portland cement it is possible to compensate in some degree, or entirely, for the normal shrinkage of Portland cement concretes.

This concept has been carried to the point of adding enough expansive component to Portland cement to produce a net expansion. That is to say, the blended expansive cement will undergo expansion rather than contraction during early ages of hydration and even under subsequent drying conditions. Such expansion has an important advantage, namely, that with adequately high expansions it is possible to bring about self-stressing of steel reinforcing members embedded in concrete and consequent prestressing of the concrete itself without the use of mechanical stressing methods.

As is well known, the structural strength of reinforced concrete and the mechanical properties of concrete structural elements are improved by stressing the steel reinforcement members, such being generally accomplished by thermal or by mechanical means, for example, by pulling upon steel reinforcement cables, rods or the like to place them in tension before the concrete has set and cured. When the pulling force is relieved the tension in the steel reinforcement members places the concrete in compression and, as a result, the concrete has greater strength and considerably greater resistance to loading conditions which produce tension in structural members. Also post tensioning of steel is practiced.

However, there are many situations where it is inconvenient or where it is impossible to carry out either thermal or mechanical post- or pre-stressing, particularly where three dimensional or volume prestressing is desired. Therefore, if a cement is prepared which is of the expansive variety and which will produce a sufficiently high net expansion of the finished concrete product, such expansion will cause stressing of appropriately anchored steel reinforcing members, and it is, therefore, applicable to situations where conventional mechanical stressing or thermal stressing is impossible or difficult or uneconomical, for example, concrete pipe, large highway slabs and cases where three dimensional stressing is desired.

Nevertheless, nonshrinking cements and self-stressing expansive cements as provided heretofore have had certain serious disadvantages. Certain of these cements have required a high degree of care during the curing period, and/or have required an excessively high ratio of cement to aggregate and/or the further addition of control agents to control expansion rates and magnitudes. The so-called Lossier cements, which are expansive cements, require the presence of a terminator, such as blast furnace slag, which is disadvantageous because of added cost, the inconvenience of multi-component systems, the presence of an additional factor requiring control and the inability to predict the ultimate magnitude and rate of expansion. Also, the Lossier cements have a low degree of expansion and have been found to be inadequate for purposes of self- or chemical prestressing.

It is an object of the present invention to provide improvements in the art of expansive cements and in the expansive components of such cements.

It is a particular object of the invention to provide an expansive cementitious material having a high degree of expansion such that the addition of a quantitatively minor portion thereof to a quantitatively major portion of Portland cement will produce a blended cement which is sufficiently expansive to bring about self-stressing of steel reinforcement and tensioning members.

Yet another object of the invention is to provide expansive cements having a high degree of expansion and which do not require the presence of a terminator or other additions to regulate the rate or magnitude of expansion.

The above and other objects of the invention will be apparent from the ensuing description and the appended claims.

For convenience of further description, certain symbols prevalent in the cement technology will be used from time to time as follows: Calcium oxide (CaO) is represented as C; aluminum oxide ($Al_2O_3$) as A; silica ($SiO_2$) as S, and sulfur trioxide ($SO_3$) as $\bar{S}$. Where extractable lime is indicated, it will be referred to as "extractable lime" or "free CaO" to distinguish it from unextractable or bound calcium oxide (C). By "extractable lime" or "free CaO" is meant lime extracted by the method of ASTM C114–58.

In accordance with my invention, a clinker is prepared which is high in extractable lime or free CaO as defined above, the remainder of which is predominantly or entirely calcium alumino sulfate. This clinker, and the cement blend to which it is added as the expansive component, contain no added terminator or, if such is added, it is added in an amount which does not significantly alter the expansive hydration of the cement.

I have found that by observing certain conditions a clinker is produced which is superior as a component of expansive cements to clinkers previously produced including those described in an article by myself and G. E. Troxell appearing in Proceedings of the American Society for Testing Materials, vol. 58 (1958), pages 986–1008.

More specifically, I start with suitable source materials for C, A and $\bar{S}$ such as calcium carbonate, alumina and gypsum; I mix them in proportions to produce a clinker having the formula $$C_a A_b \overline{S}_c + d \text{ (free CaO)}$$

wherein the molecular coefficients $a$, $b$, $c$ and $d$ are as described below; and I burn this mixture at a temperature sufficient to form a clinker but not above incipient fusion and in no case above about 2900° F.

There results from such procedure a clinker having the formula expressed above in which, taking $\overline{S}$ as unity (i.e., one mole of $SO_3$), $a$ has the approximate value of 1 to 4, $b$ has the approximate value of 1 to 3 and $d$ has the approximate value of 1 to 2. Moreover the total amount of free CaO ranges from about 21 to 40% of the weight of the clinker.

This clinker has an index of refraction of about 1.56 to 1.59. The X-ray diffraction pattern of the clinker shows spacings, including those of maximum intensities, of 4.90, 3.75, 3.49, 3.24, 2.90, 2.65 and 2.16. This order does not indicate the order of maximum intensities, since the values of maximum intensity will vary from case to case depending upon minor constituents which may reinforce or tend to cancel particular spacings.

Further criteria are as follows: Free $CaSO_4$ as determined by the method of Forsen using saturated lime water (described in A.C.I. Journal, vol. 31, January 1960) is not more than 5% by weight based on the clinker. The sum of free CaO and $SO_3$ exceeds about 37% by weight based on the clinker. The weight ratio of (free $CaO+SO_3$) to (total $CaO+Al_2O_3+SO_3$) exceeds about 0.38. The total $CaO+Al_2O_2+SO_3$ exceeds about 75% of the weight of the chlinker. With the above, where $Al_2O_3$ is referred to, $TiO_2$ is excluded. All methods of determination involved are in accordance with ASTM C114–58 specifications for analysis of Portland cement, except free $CaSO_4$, which is determined by the method of Forsen, as stated.

It has been verified by analytical procedures such as those described in a paper by Halstead and Moore, "The Composition and Crystallography of an Anhydrous Calcium Aluminosulphate Occurring in Expanding Cement," Journal of Applied Chemistry, volume 12, pages 413–417 (1962), and in a paper by Fukuda in Journal of Ceramic Association of Japan, volume 69 (1961), entitled "Investigation of Compound Compositions of Sulpho-Aluminous Cement," that the calcium sulpho-aluminate prepared by the method herein described is a stable compound and that it has the formula $C_4A_3\overline{S}$.

The following specific examples will serve further to illustrate the practice and advantages of my invention.

EXAMPLE 1

*Preparation of Clinker A–1*

An intimate, finely divided raw mix was prepared as follows, percentages being by weight.

| | Percent |
|---|---|
| Commercial grade, ground calcium carbonate (whiting) | 51.7 |
| Commercial grade gypsum | 31.3 |
| Commercial grade hydrated alumina | 17.0 |
| Total | 100.0 |

These ingredients, as indicated, were of commercial grade such as could be used in the commercial manufacture of Portland cement. The mix was ground to a fineness of about 90% through a No. 200 sieve, and was made into a thin paste with water and spread ½ inch thick, dried and cut into 1½ inch squares.

Instead of the above procedure, each ingredient may be ground separately to the desired degree of fineness and then blended dry or in admixture with water, formed into a paste, spread, etc. In either case, the resulting squares are placed in an electric furnace and heated to incipient fusion (2570° F.).

The resulting clinker had the following analysis:

*Clinker A–1 Analysis*

| | Percent |
|---|---|
| CaO (total) | 54.4 |
| $Al_2O_3$ | 25.6 |
| $SO_3$ | 18.4 |
| $SiO_2$ | 0.76 |
| $Fe_2O_3$ | 0.28 |
| MgO | 0.43 |
| $TiO_2$ | 0.01 |
| Loss on ignition | 0.47 |

By chemical analysis it was determined that Clinker A–1 contained 23.2% free CaO and 1.1% free $CaSO_4$. All chemical analyses except the determination of free $CaSO_4$ were by the methods of ASTM C114–58. The free $CaSO_4$ determination was by the method of Forsen using saturated lime water as an extractant, as described by Toshio Manabe in "Determination of Calcium Sulfoaluminate in Cement Paste by Tracer Technique," ACI Journal, vol. 31, No. 7, January 1960.

From the above data (A) free CaO plus $SO_3$ was found to be 41.6%; (B) the sum of CaO, $Al_2O_3$ (excluding $TiO_2$) and $SO_3$ was found to be 98.4%; and (C) the ratio of A to B was found to be 0.423. For convenience and to avoid repetition in the following examples, these quantities will be referred to as A, B and C, respectively.

EXAMPLE 2

*Preparation of Clinker C–4*

This clinker was prepared by the same procedure as that of Example 1 but from a raw mix as follows, percentages by weight:

| | Percent |
|---|---|
| Industrial high grade limestone | 48.5 |
| Commercial grade gypsum | 28.7 |
| South American bauxite | 22.8 |
| Total | 100.0 |

The temperature of incipient fusion was 2470° F. Analysis of Clinker C–4 was as follows:

*Clinker C–4 Analysis*

| | Percent |
|---|---|
| CaO (total) | 55.5 |
| $Al_2O_3$ | 22.1 |
| $SO_3$ | 19.0 |
| $SiO_2$ | 1.40 |
| $Fe_2O_3$ | 0.58 |
| MgO | 0.00 |
| $TiO_2$ | 0.77 |
| Loss on ignition | 0.60 |

Free lime was 23.5% and free $CaSO_4$ was 1.9%, determined by the methods referred to in Example 1. The values of A, B and C were 42.5%, 96.6% and 0.440, respectively.

EXAMPLE 3

*Preparation of Clinker B–4*

In this example, a rotary kiln fired with fuel oil and high pressure air was used instead of an electric furnace, and the ground raw mix was nodulized by application of a water spray in a rotating drum mixer and screening to yield a kiln feed between ½ inch and a No. 4 sieve. The raw mix was as follows, percentages by weight:

| | Percent |
|---|---|
| Commercial grade, ground calcium carbonate (whiting) | 48.7 |
| Commercial grade gypsum | 28.7 |
| South American bauxite | 22.6 |
| Total | 100.0 |

Analysis of Clinker B-4 was as follows:

| | Percent |
|---|---|
| CaO (total) | 55.0 |
| Al$_2$O$_3$ | 23.8 |
| SO$_3$ | 17.4 |
| SiO$_2$ | 1.70 |
| Fe$_2$O$_3$ | 0.55 |
| MgO | 0.38 |
| TiO$_2$ | 0.65 |
| Loss on ignition | 0.55 |

Free CaO and free CaSO$_4$, determined as described in Example 1, were 22.9% and 2.2%, respectively. The values of A, B and C were 40.3%, 96.2% and 0.419, respectively.

EXAMPLE 4

*Testing of Expansive Compositions A-1, B-4 and C-4 (Unrestrained Prisms)*

Each of the above clinkers (A-1, C-4 and B-4) was ground to a suitable fineness (between 2500 and 3000 square centimeters per gram as determined by ASTM C204-55) and was blended in varying proportions with a commercial ASTM Type I Portland cement having between 53 and 57% tricalcium silicate content but otherwise meeting specifications for ASTM Type II Portland cement. Each blend of expansive cement (Clinker A-1, C-4 or B-4) and Portland cement was mixed with an aggregate and water and cast into prisms as follows:

The aggregate was a mixture of 40% sand and 60% clean river gravel of ¾ inch maximum size. The cement factor was 8 sacks of blended cement per cubic yard of finished concrete. Water was added in the proportion of 31% by weight of blended cement. The mix had a slump of 1 to 2 inches by the method of ASTM C143-58. The wet mix was cast, using light vibration, into 2" x 2" x 12" molds (inside dimensions). The set prisms were stripped at eight hours. Initial length measurements were made at that time and the prisms were then cured in fog at 70° F. and at 100% relative humidity. Observations of length change were made daily. Results are set forth in Table I below:

TABLE I

| (1) Expansive component of blended cement | A-1 | C-4 | C-4 | B-4 | B-4 | B-4 |
|---|---|---|---|---|---|---|
| (2) Amount of expansive component (percent by wt. of total cement) | 25 | 20 | 25 | 20 | 25 | 30 |
| | Expansions, expressed as percent change of length | | | | | |
| Age of curing, days after casting: | | | | | | |
| 1 | 1.0 | 0.3 | 0.6 | 0.1 | 0.5 | 0.5 |
| 2 | 2.2 | 1.0 | 2.4 | 0.3 | 1.6 | 2.1 |
| 3 | 3.8 | 3.3 | 6.5 | 0.8 | 2.7 | 5.4 |
| 4 | 5.5 | 4.5 | 7.4 | 2.1 | 4.4 | 8.9 |
| 5 | 5.7 | 5.1 | 8.4 | 3.3 | 4.4 | 8.9 |
| 6 | 5.7 | 5.2 | 8.4 | 3.5 | 4.4 | 8.9 |
| 7 | 5.7 | 5.2 | 8.4 | 3.5 | 4.4 | 8.9 |
| Age at completed expansion, days | 5 | 6 | 5 | 6 | 4 | 4 |
| Maximum linear expansion, expressed as percent change of length | 5.7 | 5.2 | 8.4 | 3.5 | 4.4 | 8.9 |

In Example 4, the prisms were unrestrained. By placing reinforcement steel in a manner to restrain the prisms during curing, the expansive reaction produced tensile stresses in the steel and consequent compressive stress of the concrete. The following example illustrates the prestressing of reinforcement steel.

EXAMPLE 5

*Testing of Reinforced Prisms*

Concrete mixes were prepared as in Example 4 with the cement blends therein described and the wet mixes were cast into prisms, but steel reinforcement rods equal in cross section to 1.1% of the cross section of the prisms were applied in a restraining mechanism external to the prisms immediately after stripping the prisms from the molds. That is to say, the steel was not embedded in the concrete but was attached to a restraining mechanism such that expansion of the prisms would be imparted to the steel causing stressing of the steel. Results were as set forth in Table II below:

TABLE II

| (1) Expansive Component of Cement | (2) Amount of (1) (percent by wt. of total cement) | Maximum expansion, percent change of length | Age at maximum expansion (days) | Self stress, p.s.i., at time of maximum expansion | |
|---|---|---|---|---|---|
| | | | | Steel | Concrete |
| A-1 | 25 | 0.50 | 3 | 103,000 | 1,140 |
| C-4 | 20 | 0.53 | 4 | 107,000 | 1,220 |
| C-4 | 25 | >0.55 | 3 | 114,000 | 1,250 |
| B-4 | 20 | 0.55 | 7 | 114,000 | 1,250 |
| B-4 | 25 | 0.50 | 3 | 103,000 | 1,140 |
| B-4 | 30 | >0.75 | 3 | 155,000 | 1,700 |

In the expansive cement components of the present invention, alumina (Al$_2$O$_3$) is a preferred constituent but it may be substituted in part or in whole by other sesquioxides such as Cr$_2$O$_3$, Mn$_2$O$_3$, Fe$_2$O$_3$ and V$_2$O$_3$.

It will, therefore, be apparent that expansive cement components are provided which, when blended with regular Portland cement in minor proportions, cause substantial expansion of concrete made from the blends, and that the prestressing of steel is made possible, all without the need to add a terminator.

Moreover, by means of my invention, it is possible to control (1) the magnitude of expansion and (2) the rate of expansion. Such control will, of course, depend upon various factors such as (*a*) the Portland cement content, (*b*) the water-to-cement ratio and (*c*) the selection of expansive component. But with such factors being given, it is possible, by controlling the proportion of expansive component, to control the magnitude and rate of expansion. For example, referring to Table I hereinabove, it will be seen that by using 20, 25 or 30% of Clinker B-4 expansions (unrestrained) of 3.5, 4.4 and 8.9%, respectively, were achieved and that the rates of expansion varied considerably, being much greater with a 30% addition than with 20 and 25% additions. Referring to Table II, it will be seen that in the case of restrained prisms with reinforcement steel, similar control (greater magnitude and greater rate) are achieved with the same clinker (B-4) using larger proportions of this expansive component. It will be understood by those skilled in the art that the ability to control (as well as to achieve) the magnitudes of expansion and/or of self-stressing, and to control the rates thereof, is a great advantage.

This invention is directed primarily to the production of expansive cement blends which have a substantial degree expansion, e.g., 1% or more in unrestrained condition when mixed with water and aggregate and allowed to cure. However, in its broader aspects, by invention also includes cement blends which are non-shrinking without being expansive, or which are expansive but have a low degree of expansion. That is to say, the present invention, in its broader aspects, includes cement blends which are not expansive but which do not shrink, and it includes cement blends which are expansive but only to a slight extent, e.g., not greater than about 1%, when mixed with aggregate and water and allowed to cure in unrestrained condition. For example, my novel expansive components such as the above described Clinkers A-1, C-4 and B-4, or the expansive components of the above-mentioned Klein and Troxell article may be blended with Portland cement in an amount sufficient to produce a nonshrinking blend or a blend having a low degree of expansion, such blends being devoid of terminators or containing terminator in an amount which is not significant.

It will, therefore, be apparent that new and useful expansive cement components and new and useful expansive or non-shrinking cement blends have been provided.

I claim:

1. A calcium aluminosulfate of the formula $C_a A_b \overline{S}_c + d$ (free CaO) wherein $a$, $b$, $c$ and $d$ are molecular coefficients having values of about 1 to 4, 1 to 3, 1 and 1 to 2, respectively; C, A and $\overline{S}$ are bound CaO, bound $Al_2O_3$ and bound $SO_3$, respectively; the free CaO is extractable by the method of ASTM C114–58; the product is formed by heating a mixture of a source of CaO, a source of $Al_2O_3$ and a source of $SO_3$ to a temperature not exceeding the temperature of fusion but sufficient to form a clinker; said product having an index of refraction of about 1.56 to 1.59; having free $CaSO_4$ by the method of Forsen not greater than 5%; having a combined $CaO+SO_3$ content exceeding about 37%; having a weight ratio of free $CaO+SO_3$ to total $CaO+Al_2O_3+SO_3$ exceeding about 0.38; and having a total $CaO+Al_2O_3+SO_3$ content exceeding about 75%.

2. A cement composition consisting essentially of a major proportion of Portland cement and a minor proportion, sufficient at least to compensate for shrinkage of the Portland cement, of an expansive component, said expansive component being derived by burning, at a temperature not above about 2900° F., a mixture of a source of CaO, of X and of $SO_3$, wherein X is a sesquioxide selected from the group consisting of $Al_2O_3$, $Fe_2O_3$, $Cr_2O_3$, $Mn_2O_3$ and $V_2O_3$, said expansive component consisting essentially of (1) a stable compound in the form of a calcium alumino sulphate type of compound (2) associated CaO extractable by the method of ASTM C114–58 and (3) associated anhydrous $CaSO_4$ extractable by the method of Forsen, said calcium alumino sulphate type of compound accounting for the major portion by weight of said expansive component, said associated CaO being present in amount sufficient to impart substantial expansive properties to the expansive component when it is hydrated, said associated anhydrous $CaSO_4$ being present not in excess of about 5% of the expansive component, said composition being substantially free of added terminator.

3. The cement composition of claim 2 wherein X is $Al_2O_3$.

4. The cement composition of claim 3 wherein said associated CaO exceeds 21% by weight of the expansive component.

5. A cement composition consisting essentially of a major proportion of Portland cement and a minor proportion, sufficient at least to compensate for shrinkage of the Portland cement, of an expansive component, said expansive component being a solid ternary system consisting essentially of (1) the anhydrous compound $$(CaO)_4 \cdot X_3 \cdot SO_3$$

wherein X is a sesquioxide selected from the group consisting of $Al_2O_3$, $Fe_2O_3$, $Cr_2O_3$, $Mn_2O_3$ and $V_2O_3$, (2) CaO extractable by the method of ASTM C114–58, and (3) $CaSO_4$ extractable by the method of Forsen, said ternary system containing sufficient of said extractable CaO to cause substantial expansion of said expansive component when it is hydrated and containing not more than about 5% of said extractable $CaSO_4$ based on the weight of said expansive component, said cement composition being substantially free of added terminator.

6. The cement composition of claim 5 wherein X is $Al_2O_3$.

7. The cement composition of claim 6 wherein the extractable CaO exceeds 21% by weight of the expansive component.

8. An expansive material adapted to be added to Portland cement to at least compensate for shrinkage thereof, said expansive material being in the form of the burned product of a mixture of a source of CaO, of X and of $SO_3$, wherein X is a sesquioxide selected from the group consisting of $Al_2O_3$, $Fe_2O_3$, $Cr_2O_3$, $Mn_2O_3$ and $V_2O_3$, said burned product being formed by burning at a temperature not substantially greater than 2900° F. and consisting essentially of a ternary system having, as the major component by weight, a calcium alumino sulphate type of compound, and having as the other components CaO extractable by the method of ASTM C114–58 and anhydrous $CaSO_4$ extractable by the method of Forsen, said extractable CaO being in excess of 21% of the weight of expansive material, said anhydrous $CaSO_4$ being present not in excess of about 5% of the weight of said expansive material.

9. The expansive material of claim 8 wherein X is $Al_2O_3$.

References Cited in the file of this patent

FOREIGN PATENTS

| | | |
|---|---|---|
| 647,156 | Great Britain | Aug. 15, 1947 |
| 485,135 | Canada | July 22, 1952 |

OTHER REFERENCES

Roller: "Industrial and Engineering Chemistry," June 1934, vol. 26, page 675.

Lea et al.: "The Chemistry of Cement and Concrete," Edward Arnold Publishers, London, 1956, pages 198–202.